(12) United States Patent
Tuulari et al.

(10) Patent No.: US 9,248,341 B2
(45) Date of Patent: Feb. 2, 2016

(54) PEDALLING DATA TRANSFER

(71) Applicant: Polar Electro Oy, Kempele (FI)

(72) Inventors: Esa Tuulari, Kempele (FI); Jari Miettinen, Kempele (FI)

(73) Assignee: Polar Electro Oy, Kempele (FI)

( * ) Notice: Subject to any disclaimer, the term of this patent is extended or adjusted under 35 U.S.C. 154(b) by 0 days.

(21) Appl. No.: 13/741,712

(22) Filed: Jan. 15, 2013

(65) Prior Publication Data

US 2013/0197744 A1 Aug. 1, 2013

(30) Foreign Application Priority Data

Jan. 27, 2012 (FI) .................................... 20125086

(51) Int. Cl.
*A63B 24/00* (2006.01)
*H04L 29/08* (2006.01)
*G01M 17/007* (2006.01)
*G01L 5/22* (2006.01)
*G01L 1/26* (2006.01)
*G01L 3/14* (2006.01)

(52) U.S. Cl.
CPC ............ *A63B 24/0062* (2013.01); *H04L 67/12* (2013.01); *H04L 67/125* (2013.01); *G01L 1/26* (2013.01); *G01L 3/14* (2013.01); *G01L 5/225* (2013.01); *G01M 17/007* (2013.01)

(58) Field of Classification Search
CPC ..... H04L 1/0083; H04L 67/12; H04L 67/125; A63B 24/0062; G01L 1/26; G01L 3/14; G01L 5/225; G01M 17/007
USPC .................. 701/34.2, 34.4; 340/432
See application file for complete search history.

(56) References Cited

U.S. PATENT DOCUMENTS

| 6,625,523 | B2 * | 9/2003 | Campagnolo et al. ........ 340/432 |
| 7,590,121 | B2 * | 9/2009 | de Mier ........................ 370/394 |
| 7,599,806 | B2 * | 10/2009 | Hauschildt ..................... 702/44 |
| 8,011,242 | B2 * | 9/2011 | O'Neill et al. ............. 73/379.01 |
| 8,897,835 | B2 * | 11/2014 | Yuen .......................... 455/556.1 |
| 2002/0154605 | A1 * | 10/2002 | Preston et al. ................ 370/254 |
| 2009/0119032 | A1 * | 5/2009 | Meyer ............................ 702/44 |
| 2010/0093494 | A1 | 4/2010 | Smith |

(Continued)

FOREIGN PATENT DOCUMENTS

| EP | 1182440 A2 | 2/2002 |
| EP | 2072387 A1 | 6/2009 |

(Continued)

OTHER PUBLICATIONS

Sairam, K.; Gunasekaran, N.; Redd, S.R., "Bluetooth in wireless communication," Communications Magazine, IEEE, vol. 40, No. 6, pp. 90-96, Jun. 2002.*

(Continued)

*Primary Examiner* — Helal A Algahaim
*Assistant Examiner* — Donald J Wallace
(74) *Attorney, Agent, or Firm* — Hoffmann & Baron, LLP

(57) ABSTRACT

A method, apparatus, and computer program for transferring data are presented. In the method, pedalling data is received in a processor, wherein the pedalling data characterize pedalling quantity measured from the force transmission system of a bicycle. A transmission data frame comprising a first subframe including at least a portion of the pedalling data is formed, and the transmission data frame is outputted for wireless transmission.

26 Claims, 4 Drawing Sheets

(56) References Cited

U.S. PATENT DOCUMENTS

| | | |
|---|---|---|
| 2011/0041626 A1 | 2/2011 | Tuulari et al. |
| 2011/0067503 A1* | 3/2011 | Roudergues et al. ...... 73/862.51 |
| 2011/0087446 A1* | 4/2011 | Redmond et al. ............... 702/44 |
| 2012/0109872 A1* | 5/2012 | Havinga et al. ................. 706/52 |

FOREIGN PATENT DOCUMENTS

| | | |
|---|---|---|
| WO | WO2011063468 A1 | 6/2011 |
| WO | WO 2012111007 A1 * | 8/2012 |

OTHER PUBLICATIONS

Dzung, D.; Apneseth, C.; Endresen, J.; Frey, Jan-Erik, "Design and implementation of a real-time wireless sensor/actuator communication system," Emerging Technologies and Factory Automation, 2005. ETFA 2005. 10th IEEE Conference on , vol. 2, pp. 433-442, Sep. 19-22, 2005.*

Tuomo Reiniaho, Finnish Search Report for corresponding Finnish Application No. 20125086, p. 1, Sep. 7, 2012.

* cited by examiner

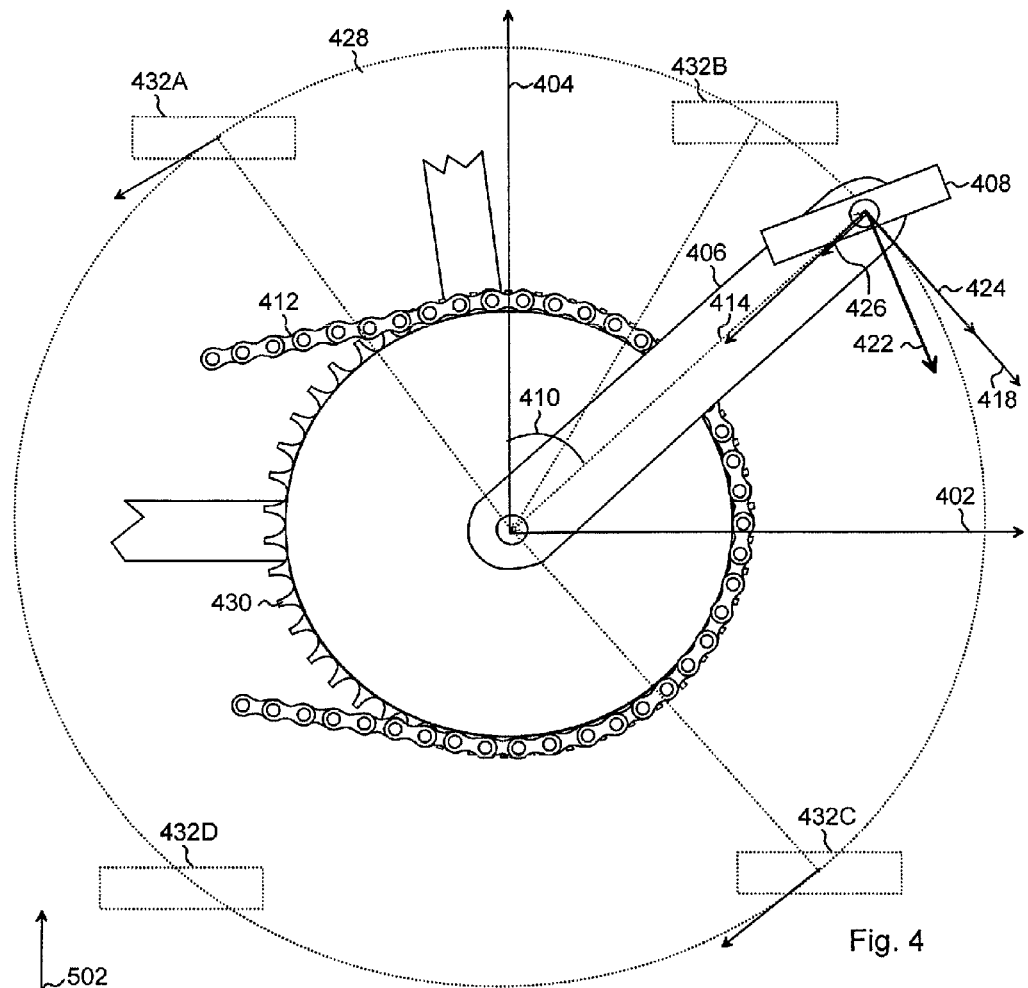
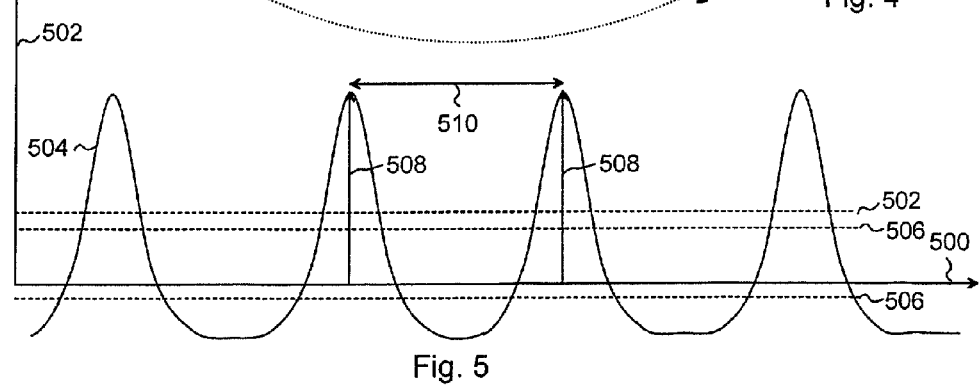
Fig. 4
Fig. 5

PEDALLING DATA TRANSFER

CROSS-REFERENCE TO RELATED APPLICATION

This application claims priority based on Finnish Application No. 20125086, filed Jan. 27, 2012, which is incorporated herein by reference in its entirety.

BACKGROUND

1. Field

The invention relates to transferring pedalling data of a bicycle wirelessly.

2. Description of the Related Art

Pedalling measurement refers to measuring various parameters from a pedalling action with a bicycle of bicycle-like apparatus. The measurement may be utilized in various products relating to sports, exercise, medicine, bicycles, or exercise cycles, for example. As sensors carrying out pedalling measurements are often remotely located from user interface units, such as wrist or handlebar-fixed devices, a wireless communication is very useful means for transferring pedalling data between a sensor and a user interface unit. Therefore, it is useful to develop technology of wireless communication in transferring pedalling information.

SUMMARY

According to an aspect of the present invention, there is provided a data transfer method, comprising: acquiring pedalling data in a processing circuitry, wherein the pedalling data characterizes pedalling quantity measured from a force transmission system of a bicycle; forming in the processing circuitry a transmission data frame comprising a first information element including at least a portion of the pedalling data; and outputting in the processing circuitry the transmission data frame for wireless transmission.

According to another aspect of the present invention, there is provided an apparatus, comprising: a processor, a memory comprising a computer program code, wherein the processor, the memory, and the computer program code are configured to cause the apparatus to: acquire pedalling data from a measurement circuitry, wherein the pedalling data characterize pedalling quantity measured from the force transmission system of a bicycle; form a transmission data frame comprising a first information element including at least a portion of the pedalling data; and output the transmission data frame for wireless transmission.

According to yet another aspect of the present invention, there is provided a computer program product embodied on a non-transitory distribution medium readable by a computer and comprising program instructions which, when loaded into the computer, execute a computer process comprising: acquiring pedalling data, wherein the pedalling data characterizes pedalling quantity measured from a force transmission system of a bicycle; forming a transmission data frame comprising a first information element including at least a portion of the pedalling data; and outputting the transmission data frame for wireless transmission.

Embodiments of the invention are defined in the dependent claims.

BRIEF DESCRIPTION OF THE DRAWINGS

Embodiments of the present invention are described below, by way of example only, with reference to the accompanying drawings, in which

FIG. 4 illustrates an example of pedalling dynamics;

FIG. 5 illustrates an example of pedalling forces and pedalling power;

DETAILED DESCRIPTION

The following embodiments are exemplary. Although the specification may refer to "an" embodiment in several locations, this does not necessarily mean that each such reference is to the same embodiment(s), or that the feature only applies to a single embodiment. Single features of different embodiments may also be combined to provide other embodiments.

With reference to FIGS. 1 to 8 embodiments of the invention are illustrated.

Figure 1:
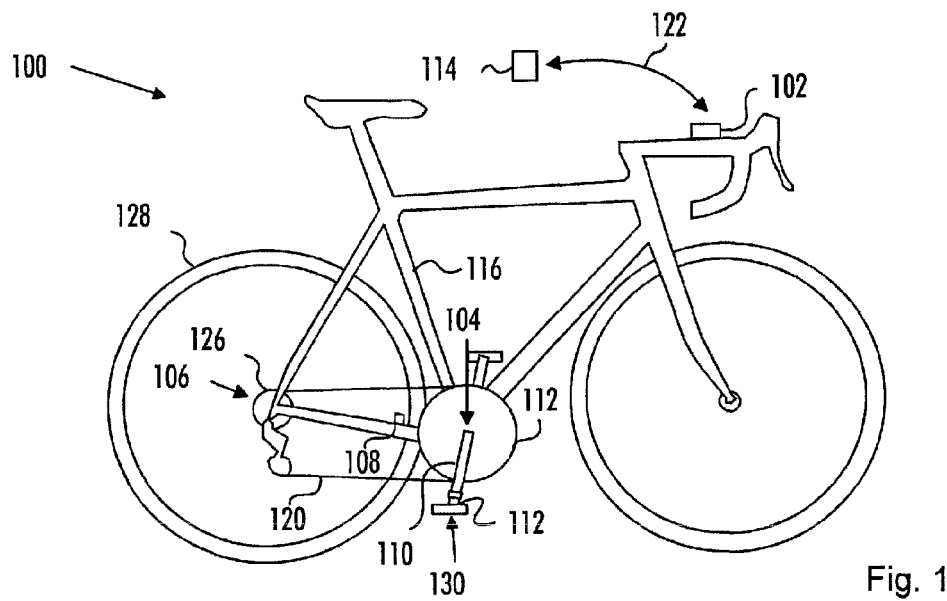
FIG. 1 illustrates embodiments of pedalling sensors.

FIG. 1 shows embodiments of a pedalling sensor 104, 106, 108, 112 for measuring a pedalling quantity from the force transmission system of the bicycle. The force transmission system comprises, for example, a pedal 130 including a pedal spindle, a crank arm 110, a spindle, a front sprocket 124, a chain 120, a rear sprocket 126, a rear wheel axle, and a rear wheel 128.

In an embodiment, the pedalling sensor 112 is located in the pedal 130. The pedalling sensor 112 in this case may comprise strain gauges configured to measure deformation of the pedal 130 or the pedal spindle. An example of pedalling sensor is PowerGear by Garmin.

In an embodiment, the pedalling sensor 104 is located in the spindle in the bottom bracket. The pedalling sensor 104 may apply strain gauges configured to measure deformation of the spindle. An example of a trade name for such a pedalling sensor is SRM PowerMeter.

In an embodiment, the pedalling sensor is located in the crank arm 110. The pedalling sensor may apply strain gauges configured to measure deformation of the crank arm 110. An example of a trade name for such a pedalling sensor is SRAM.

In an embodiment, the pedalling sensor 108 measures deformation or vibration frequency of the chain 120. The measurement may be done from directly from the chain 120 or indirectly from bike body 116 by detecting mechanical vibration conducted into the bike body 116 arising from the chain vibration.

In an embodiment, the pedalling sensor 106 is located in the rear wheel axle. The pedalling sensor may 106 apply strain gauges configured to measure the deformation of the rear wheel axle. An example of a trade name of such a pedalling sensor is PowerTap.

In an embodiment, the pedalling sensor 104, 106, 108, 112 determines pedalling power as a pedalling quantity.

In an embodiment, the pedalling sensor 104, 106, 108, 112 determines pedalling force as a pedalling quantity.

In an embodiment, the pedalling sensor 104, 106, 108, 112 determines overall pedalling power as a pedalling quantity. The overall pedalling power includes contribution from the left and right sides.

In an embodiment, the pedalling sensor 104, 106, 108, 112 determines overall pedalling force as a pedalling quantity. The overall pedalling force includes contribution from the left and right sides.

In an embodiment, the pedalling sensor 104, 106, 108, 112 determines left pedalling power as a pedalling quantity.

In an embodiment, the pedalling sensor 104, 106, 108, 112 determines right pedalling power as a pedalling quantity.

In an embodiment, the pedalling sensor 104, 106, 108, 112 determines left pedalling force as a pedalling quantity.

In an embodiment, the pedalling sensor 104, 106, 108, 112 determines right pedalling force as a pedalling quantity.

In an embodiment, the pedalling sensor 104, 106, 108, 112 determines left tangential pedalling force as a pedalling quantity.

In an embodiment, the pedalling sensor 104, 106, 108, 112 determines right tangential pedalling force as a pedalling quantity.

In an embodiment, the pedalling sensor 104, 106, 108, 112 determines left radial pedalling force as a pedalling quantity.

In an embodiment, the pedalling sensor 104, 106, 108, 112 determines right radial pedalling force as a pedalling quantity.

In an embodiment, the pedalling sensor 104, 106, 108, 112 determines a maximum value of a pedalling parameter as a pedalling quantity.

In an embodiment, the maximum value of a pedalling parameter is selected from a group comprising: left radial maximum pedalling force, right radial maximum pedalling force, left tangential maximum pedalling force, right tangential maximum pedalling force, and maximum cadence.

In an embodiment, the pedalling sensor 104, 106, 108, 112 measures an angle of a crank as a pedalling quantity. The angle of a crank characterizes an angle of the crank relative to a reference. The reference may be direction of gravity or a bike part, such as a position of a detection element. In an embodiment, the angle of crank is determined with accelerometer by using direction of gravity as a reference, for example.

In an embodiment, the angle of a crank characterizes a turning point where a pedalling force and/or power exceeds the value of zero during a pedalling cycle. The turning point is typically a crank angle where the pedalling changes from push-phase to pull-phase during a crank revolution.

A pedalling quantity may be instantaneous or determined as an average over a time period or over a range of the crank angle. An average time may vary from milliseconds to seconds. The average time may be selected from a group comprising 100 ms, 200 ms, 300 ms, 400 ms, 500 ms, 600 ms, 700 ms, 900 ms, 900 ms, 1000 ms, 1 s, 2 s, 5 s.

In an embodiment, the pedalling quantity includes pedalling synchronization data relating to left and right pedal cycles. In an embodiment, the pedalling synchronization data is an accumulated number of revelations counted from a reference time instant. The pedalling synchronization data can be used to synchronize pedalling data, such as force and power-related data obtained from left and right pedalling cycles.

The system 100 may further comprise a user interface unit 102. The user interface unit 102 may be a bike computer, a mobile phone, a laptop computer carried by a coach, or a wrist computer, for example. A user interface run in the user interface unit 102 may show various cycling-related parameters such as elapsed time, speed, distance, elevation, cadence, and/or route information. In an embodiment, the user interface displays a pedalling quantity or a parameter calculates from a pedalling quantity.

The system 100 may also comprise a heart activity measurement unit 114. The heart activity measurement unit 114 may be strapped around the chest of the cyclist, for example. The heart activity measurement unit 114 may produce heart activity information, such as a heart rate. The heart activity measurement unit 114 may transmit the wireless heart activity signal 122 to the user interface unit 102.

Figure 2:
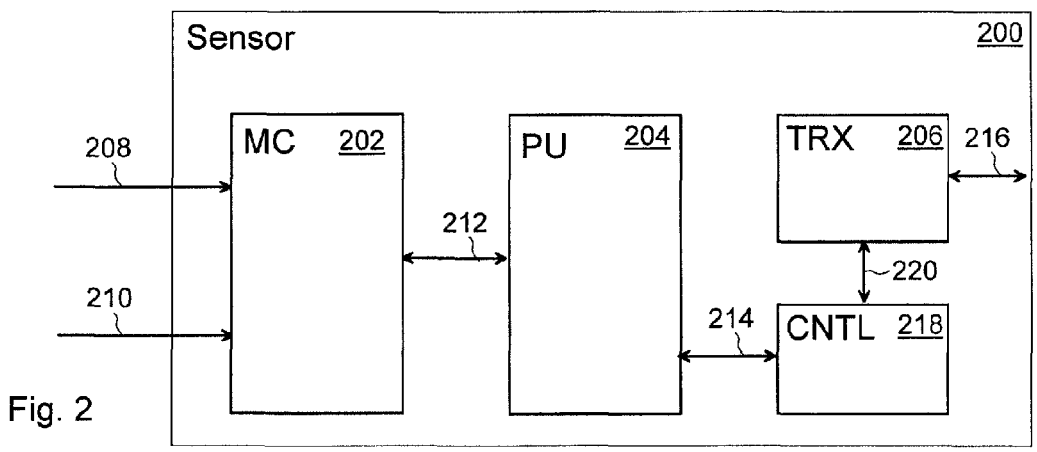
FIG. 2 illustrates an embodiment of a pedalling sensor.

With reference to FIG. 2, an embodiment of a sensor 200 for measuring pedalling quantity is illustrated. The sensor 200 comprises a measurement circuitry 202, a processing unit 204, a radio controller 218 and a radio transceiver 206.

The measurement circuitry 202 receives analogue or digital measurement signals 208, 210 from pedalling measurement gauges or gauge circuitry. The gauge may be selected from a group comprising: strain gauge, vibration detectors, such as a piezo element, optical strain gauge element based on interferometry, for example. In an embodiment, the gauge comprises an accelerometer configured to detect the crank angle.

The pedalling measurement gauges or gauge circuitry may be integrated into the sensor 200. The measurement circuitry 202 may perform the following tasks: amplifying the measurement signals 208, 210, converting the measurement signals 208, 210 into digital form, and filtering. The process carried out by the measurement circuitry 202 results in pre-processed measurement data 212 which are outputted. The measurement circuitry 202 may comprise logic components, standard integrated circuits, application-specific integrated circuits (ASIC), and/or other suitable electronic structures.

The pre-processed measurement data 212 are inputted into the processing unit 204. In an embodiment, the processing unit 204 performs a computation process on the pre-processed measurement data 212, thus resulting in pedalling data 214. The pedalling data 214 includes the pedalling quantity or parts thereof in a digital form. The computation process may comprise calculation of a pedalling quantity from the pre-processed digital measurement signal 212.

In an embodiment, the computation process comprises calculating an integral of the pre-processed digital measurement signal 212 over a time period or pedalling cycle, thus resulting in an effective value, such as an average, of the pedalling quantity. In an embodiment, the computation process includes determining a maximum value of a pedalling parameter.

In an embodiment, the computation process comprises determining crank angle value or range of crank angles, during which a pedalling power or a pedalling force fulfils a predetermined condition. In this case, the pedalling quantity may include a range of crank angles, during which the pedalling power or force is negative, positive or zero within a predetermined limit. The pedalling quantity may be specific to a left and right sides. The processing unit 204 outputs pedalling data 214. The pedalling data 214 may be outputted autonomously at predetermined intervals. The output rate may be a few times per second, e.g. more than two times per second and/or less than ten times per second. In another embodiment, the pedalling data 214 is outputted according to pedalling cycle.

The processing unit 204 may be implemented with a processor, a memory storing coded instructions written in the form of a computer program.

The radio controller 218 receives the pedalling data 214 and forms a transmission data frame to be transmitted wirelessly. In an embodiment, the radio controller 218 requests for pedalling data 214 from the processing unit 204. In an embodiment, the transmission data frame comprises at least one information element which includes at least a portion of the pedalling data 214. The pedalling data 214 may be in coded form. The radio controller 218 outputs the transmission data frame 220.

The radio controller 218 may be implemented with a digital processor capable of executing coded instructions written in the form of a computer program and stored in a memory accessible by the radio controller 218.

The transmission data frame 220 is received by the radio transceiver 206. The radio transceiver 206 implements the physical layer for wireless communication by embedding the transmission data frame 220 into a radio signal 216.

The radio transceiver 206 may operate according to a suitable proximity communication, i.e. with a communication technology that takes place over relatively small distances. A suitable range may vary from 0.5 to 1.5 meters. Longer ranges, such as tens of meters, may also be applied. In an embodiment, the range may be such that it encompasses typical communication path lengths within a bicycle. The proximity communication may be implemented with an induction-based technology utilizing a magnetic field, or a radio-based technology utilizing electric radiation, for example. The radio transmission may utilize a proprietary transceiver (operating at a 2.4 gigahertz frequency, for example), or a Bluetooth transceiver, for example. Emerging ultra low power Bluetooth technology may also be used. Other suitable proximity communication techniques may include techniques based on light or sound, such as infrared communication or sonic communication. The proximity communication may utilize any suitable protocols: the principles of time division and/or packet transmission, for example. The radio transmission may also operate according to some WLAN (Wireless Local Area Network) standard.

The term 'processor' in the processing unit 204 and radio controller refers to a device that is capable of processing data. The processor may comprise an electronic circuit implementing the required functionality, and/or a microprocessor running a computer program implementing the required functionality. When designing the implementation, a person skilled in the art will consider the requirements set for the size and power consumption of the sensor 200, the necessary processing capacity, production costs, and production volumes, for example. Together, the processing unit 204 and the radio controller may realize a processing circuitry. The processing circuitry may comprise at least one processor executing the functions of the processing unit 204 and the radio controller 218. The functions of the processing unit 204 and the radio controller 218 may be distributed amongst a plurality of processors or a plurality of cores of a single processor, but in other embodiments the operations of both the processing unit 204 and the radio controller 218 are realized by a single processor or a single processor core.

The coded instructions may be coded as a computer program using a programming language, which may be a high-level programming language, such as C, or Java, or a low-level programming language, such as a machine language or assembly language. The processor may comprise a set of registers, an arithmetic logic unit (ALU), and a control unit. The control unit is controlled by a sequence of program instructions transferred to the processor from a program memory. The control unit may contain a number of microinstructions for basic operations. The implementation of the microinstructions may vary, depending on the processor design. The microprocessor may also have an operating system (a dedicated operating system of an embedded system, or a real-time operating system), which may provide the computer program with system services.

Figure 3:
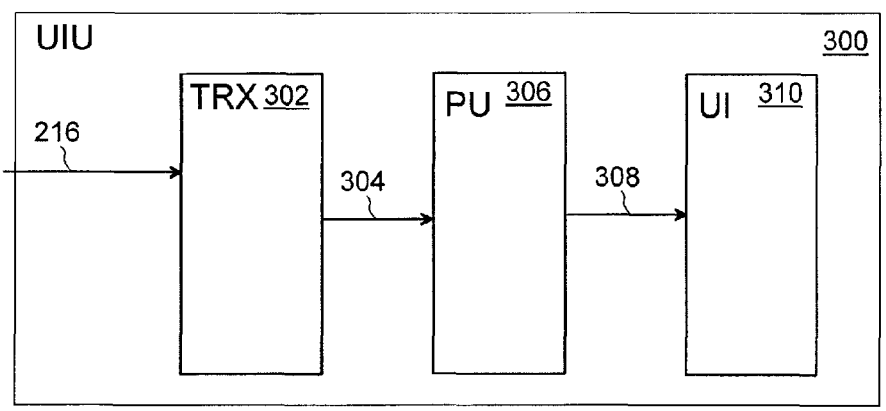
FIG. 3 illustrates an embodiment of user interface unit.

FIG. 3 shows an embodiment of a user interface unit 300. The user interface unit 300 comprises a radio transceiver 302, a processing unit 306 and a user interface 310.

The radio signal 216 is received by the radio transceiver 302 which demodulates the radio signal 216 to base band frequency and outputs the transmission data frame 304 to the processing unit 306. The processing unit 306 receives the transmission data frame and extracts the pedalling data 308 from the transmission data frame. In an embodiment, the pedalling data 308 is outputted to the user interface 310. The user interface 310 may display the pedalling data 308 to the user.

With reference to FIG. 4, pedalling dynamics scheme and measurement geometry are exemplified.

While pedalling, the pedal 408 travels along a pedalling trajectory 428. At any given time, an instantaneous crank angle 410 has a value between 0 and 360 degrees. The crank angle is expresses as an angular value compared to a reference 404. As the cranks 406 (note that the other crank is not shown in FIG. 4 in order to improve clarity) are rotated, a sprocket 430 rotates a chain 412, which, in turn, rotates another sprocket and a rear wheel axle connected to the other sprocket, whereby the force generated by the pedalling action is transmitted to the rear wheel.

When the person's foot presses the pedal 408 to the direction of an instantaneous pedalling force vector 422, the force can be divided into a tangential pedalling force 424 and a radial pedalling force 426. However, when considering the pedalling power transmitted to the chain 412, the tangential direction 424 only matters. There are however approaches where both tangential and radial forces are considered in the pedalling power calculation. An instantaneous pedalling power $P_{i,out}$ may be obtained from equation $$P_{i,out}=F_{i,tan} \times v_{circ,i}=F_{i,tan} \times \omega_i \times r_{crank}, \quad (1)$$

wherein $F_{i,tan}$=instantaneous pedalling force,
$v_{circ,i}$=instantaneous circumferential velocity of the pedal,
$\omega_i$=angular speed of the crank, and
$r_{crank}$=crank arm length 414, i.e. separation between the rotation axis of the crank and the pedal spindle.

The force transmission chain 412 forms an endless loop which transmits the tangential force 422 to the rear sprocket 430 and generates torque which is transmitted to the rear wheel. The rear wheel further transforms the torque into tangential force which is transmitted to the ground, thus resulting in overall motion of the bicycle.

The tension in the chain 412 results in deformation of the force transmission chain 412. A longitudinal deformation, i.e. the stretch of the force transmission chain 106 is proportional to the stretching force. The relationship between the stretch x and stretching force F may be written as $$F=k \times x+k'x^2+k''x^3, \quad (1)$$

wherein k, k" and k" are constants depending upon force transmission chain characteristics, such as mass and elastic properties. A typical stretch may exceed 4 millimeters at 1000 N force, thus providing a well detectable deformation.

If the chain 412 is displaced from an equilibrium position in direction perpendicular force transmission trajectory, the chain 412 vibrates at a frequency which is proportional to the stretching force. Such a displacement may be generated when a moving pin of the chain 422 hits a tooth of the front sprocket. In harmonic approximation, the stretching force is proportional to the square of the vibration frequency of the force transmission chain 422, and the pedalling power may be obtained by measuring the vibration frequency of the chain 422.

FIG. 4 further illustrates angular measures associated with pedalling. Virtual pedal positions 432A, 432B and 432C are shown, and their position may be characterized with angles from reference 404.

Let us first consider turn points 432B, 432D, also referred to as dead spots. A turn point 432B, 432D is a point in angles where pedalling force from the foot to the pedal is zero. In normal biking there are two turn points 432B, 432D per each crank revolution: the first turn point 432B is near the top before foot starts to push the pedal downwards, while the second turn point 432D is at the bottom where the push-phase ends and positive force of the foot becomes smaller than the weight of the foot loading the pedal 408. Points 432A and 432C illustrate points where the pedalling force is negative.

At a turn point 432B, 432D the pedalling force changes from positive to negative and vice versa.

Based on the turn point 432B, 432D it is possible to calculate the portion of time or degrees of the complete crank revolution that is spent on the positive versus negative force phase. In an embodiment, the pedalling quantity characterizes such a portion of time or degrees.

The angular sector between point 432C and 432A may also be considered as a pulling phase where the foot pulls the pedal. In an embodiment, the pedalling quantity characterizes the start and/or end of a pulling phase.

The angular sector between point 432A and 432C may also be considered as a pushing phase where the foot pushes the pedal. In an embodiment, the pedalling quantity characterizes the start and/or end of a pushing phase.

With reference to FIG. 5, the concept of positive and negative pedalling force and pedalling power are dealt with.

The x axis 500 shows time in arbitrary unit, whereas the y axis 502 shows left or right pedalling force in arbitrary units.

Instantaneous pedalling force is illustrated with force curve 504. The pedalling force is positive when the force curve is above the x axis 500. The pedalling force is negative when the force curve 504 is below the x axis 500.

The positive pedalling power calculated from the pedalling force is shown with graph 502. The positive pedalling power is defined as the power that moves the pedals to the direction of normal forward biking. The positive pedalling power is obtained from the positive pedalling force.

In an embodiment of the invention, the pedalling quantity represents the positive pedalling force. The positive pedalling force may be an instantaneous value or an average over predetermined time period or number of pedalling cycles.

In an embodiment of the invention, the pedalling quantity represents the positive pedalling power. The positive pedalling power may be an instantaneous value or an average over predetermined time period or number of pedalling cycles.

The negative pedalling power calculated from the pedalling force is shown with graph 506. The negative pedalling power is calculated from the negative force. The negative pedalling power is the power that moves or tries to move the pedals backwards. Negative power appears also if a fix-hub bike is pedalled backwards.

In an embodiment of the invention, the pedalling quantity represents the negative pedalling force. The negative pedalling force may be an instantaneous value or an average over predetermined time period or number of pedalling cycles.

In an embodiment of the invention, the pedalling quantity represents the negative pedalling power. The negative pedalling power may be an instantaneous value or an average over predetermined time period or number of pedalling cycles.

In normal forward biking, the negative pedalling force and pedalling power for are generated when the foot is not lifting the pedal forcefully enough to eliminate the weight of the foot during the lifting phase.

A normal total pedalling power is obtained by subtracting negative pedalling power from the positive negative power. The normal total pedalling power is shown with graph 506. In an embodiment of the invention, the pedalling quantity represents the normal total pedalling power.

A normal total pedalling force is obtained by subtracting negative pedalling force from the positive negative force. In an embodiment of the invention, the pedalling quantity represents the normal total pedalling force.

In an embodiment of the invention, the pedalling quantity characterizes a pedalling ratio. The pedalling quantity may comprise the pedalling ratio.

In an embodiment of the invention, the pedalling ratio presents the relation, such as ratio, between the negative pedalling power and positive pedalling power.

In an embodiment of the invention, the pedalling ratio presents the relation, such as ratio, between the negative pedalling power and normal total pedalling power.

In an embodiment of the invention, the pedalling ratio presents the relation, such as ratio, between the positive pedalling power and normal total pedalling power.

In an embodiment of the invention, the pedalling ratio presents the relation, such as ratio, between the negative pedalling force and positive pedalling force.

In an embodiment of the invention, the pedalling ratio presents the relation, such as ratio, between the negative pedalling force and normal total pedalling force.

In an embodiment of the invention, the pedalling ratio presents the relation, such as ratio, between the positive pedalling force and normal total pedalling force.

FIG. 5 further shows a cadence 510, also referred to as pedalling cycle, which represents the time interval between two points of the same phase, such as force maxima 508, of successive pedalling sequence.

Figure 6:
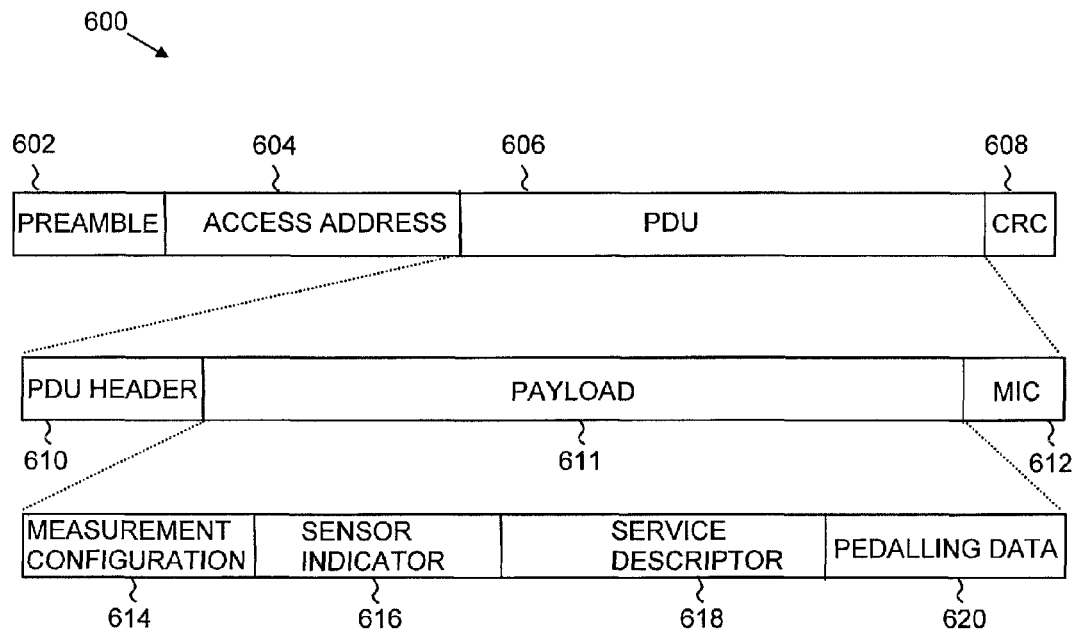
FIG. 6 illustrates examples of transmission data frames.

With reference to FIG. 6, an example of a transmission data frame 600 structure is shown. The transmission data frame 600 is a data structure comprising fields 602, 604, 606, 608. Each field 602, 604, 606, 608, 610 comprises information bits, wherein some of the information bits may comprise control bits, e.g. signalling bits, while other information bits may comprise data bits, e.g. payload data bits.

In an embodiment, the transmission data frame 600 is an advertising packet.

In an embodiment, the transmission data frame 600 is a link layer data packet.

In an embodiment, a field 602 comprises a preamble including synchronizing bits. In an embodiment, the preamble is compliant with Bluetooth standard, such as Bluetooth 4.0 standard.

In an embodiment of, a field 604 comprises access address data. The access address data field 604 may follow the preamble field 602, as shown in FIG. 6. The access address data may specify a physical link access code. In an embodiment, the access address data are compliant with Bluetooth standard, such as Bluetooth 4.0 standard.

In an embodiment, a field 606 comprises PDU (Protocol Data Unit) data. The PDU data comprises payload data. The payload data may include pedalling data which characterizes a pedalling quantity measured from the force transmission system of the bicycle, as described above. The length of the payload data may vary from 0 to 27 octets, for example.

In an embodiment, the PDU data field 606 comprises PDU header data 610. The length of the PDU header may be 2 octets, for example.

In an embodiment, the PDU data field 606 comprises the actual payload data 611 comprising the pedalling data in an information element 620, for example.

In an embodiment, the PDU data field 606 comprises message integrity check (MIC) bits 612. The length of the MIC may be 4 octets, for example.

In an embodiment, the PDU data field 606 is compliant with Bluetooth standard, such as Bluetooth 4.0 standard.

In an embodiment, a field 608 comprises Cycling Redundancy Check (CRC) bit or bits. In an embodiment, the CRC bits are compliant with Bluetooth standard, such as Bluetooth 4.0 standard.

In an embodiment, the payload data 611 comprise an information element comprising measurement configuration data 614. The measurement configuration data indicates the measurement configuration information, such as chain vibration length, chain mass, crank length, point of moment at pedal spindle, side (left, right, left & right), sprocket size, and or number of sprocket teeth.

In an embodiment, the payload data 611 comprise an information element comprising sensor indicator data 616.

In an embodiment, the sensor indicator 616 indicates the location of the measurement of the pedalling quantity in the bicycle. The sensor indicator may indicate at least one sensor location selected from a group comprising: pedal, pedal spindle, spindle in the bottom bracket, crank arm, bike body based on chain vibration, rear wheel axle, left side, right side.

In an embodiment, the sensor indicator 616 indicates the sensor model. The indicator may indicate the manufacturer and version of the sensor.

In an embodiment, the sensor indicator 616 indicates the sensor technology type. The sensor technology type may be, for example, strain gauge-based, vibration based, torque-based. In an embodiment, the sensor type identifies the definition of pedalling quantity, such as definition for pedalling power and or force. The definition for pedalling power may specify, for example, contribution of tangential and/or radial pedalling forces to the pedalling power.

In an embodiment, the payload data 611 comprise an information element comprising service description data 618. The service description data 618 specifies the data type the sensor 200 transmits. In an embodiment, the service description data 618 indicates that the payload data 611 includes pedalling data.

In an embodiment, the service description 618 indicates that the payload data includes pedalling power data.

In an embodiment, the service description 618 indicates that the payload data includes pedalling force data.

In an embodiment, the service description 618 indicates that the pedalling data includes right side pedalling data.

In an embodiment, the service description 618 indicates that the pedalling data includes left side pedalling data.

In an embodiment, the service description 618 indicates the pedalling data includes angle of crank information.

In an embodiment, the service description 618 indicates the pedalling data includes maximum value of a pedalling parameter.

In an embodiment, the service description 618 indicates the pedalling data includes right pedalling force.

In an embodiment, the service description 618 indicates the pedalling data includes left pedalling force.

In an embodiment, the service description 618 indicates the pedalling data includes right tangential pedalling force.

In an embodiment, the service description 618 indicates the pedalling data includes right radial pedalling force.

In an embodiment, the service description 618 indicates the pedalling data includes right radial pedalling force.

In an embodiment, the service description 618 indicates the pedalling data includes left radial pedalling force.

In an embodiment, the service description 618 indicates the pedalling data includes positive pedalling force.

In an embodiment, the service description 618 indicates the pedalling data includes negative pedalling force.

In an embodiment, the service description 618 indicates the pedalling data includes positive pedalling power.

In an embodiment, the service description 618 indicates the pedalling data includes negative pedalling power.

In an embodiment, the service description 618 indicates the pedalling data includes normal total pedalling power.

In an embodiment, the service description 618 indicates the pedalling data includes normal total pedalling force.

In an embodiment, the service description 618 indicates the pedalling data includes pedalling synchronization data.

The service description data may comprise bits, each presenting the presence of one of above pedalling data elements in the payload data 611.

In an embodiment, the payload data 611 includes pedalling data 620.

Figure 7:
FIG. 7 illustrates example configuration data frame.

FIG. 7 illustrates a configuration data frame 700.

The sensor 200 is configured to receive a radio signal 216 including the configuration data frame 700 with the radio transceiver 206.

The configuration data frame 700 comprises configuration data to be applied when processing the pedalling data 214 from the pre-processed measurement data.

In an embodiment, the configuration data comprises a crank length.

In an embodiment, the configuration data comprises chain information, such as the mass of chain and/or vibration length of the chain 120.

In an embodiment, the configuration data comprises at least one calibration parameter for calibrating the pedalling quantity.

The radio controller 218 is configured to extract the configuration data frame 700 from the radio signal and output the configuration data frame 700 to the processing unit.

In an embodiment, the configuration data frame 700 includes a preamble 702.

In an embodiment, the configuration data frame 700 includes access address data 704. The access address data may comprise an information element specifying the recipient and/or the transmitter of the configuration data frame.

In an embodiment, the configuration data frame 700 includes PDU 706.

In an embodiment, the configuration data frame 700 includes CRC bits 708.

In an embodiment, the PDU includes the configuration data.

Figure 8:
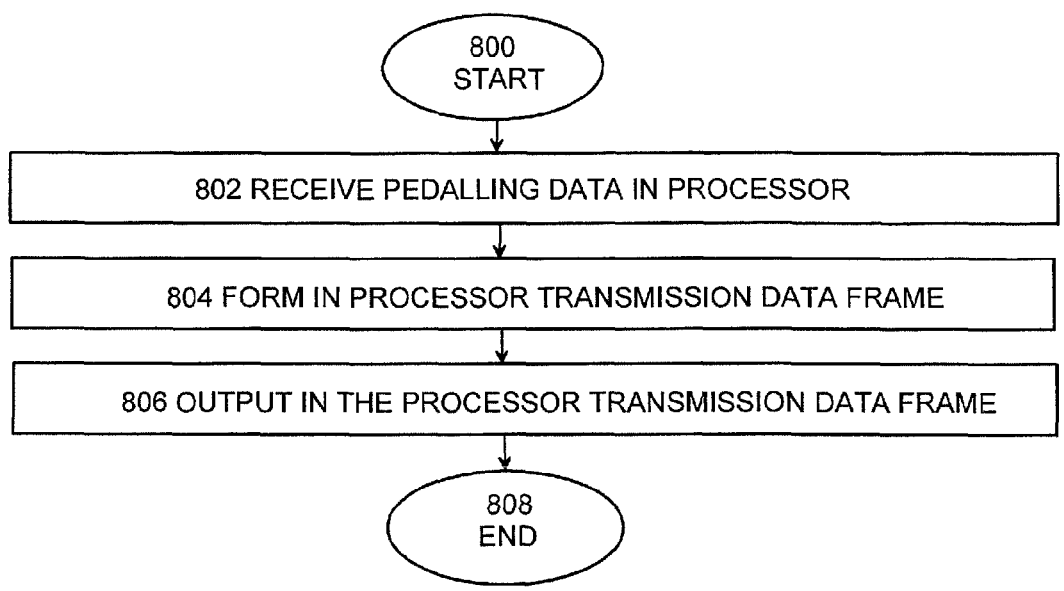
FIG. 8 illustrates an embodiment of the method.

With reference to FIG. 8, embodiments of the method are illustrated.

In 800, the method starts.

In 802, pedalling data is received in a processor, wherein the pedalling data characterize pedalling quantity measured from the force transmission system of a bicycle.

In 804, a transmission data frame is formed in the processor, the transmission data frame comprising a first information element including at least a portion of the pedalling data.

In 806, the transmission data frame is outputted in the processor for wireless transmission.

In 808, the method ends.

The processes or methods described in connection with above Figures may also be carried out in the form of a computer process defined by a computer program. The computer program may be in source code form, object code form, or in some intermediate form, and it may be stored in some sort of carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital processing unit or it may be distributed amongst a number of processing units.

It will be obvious to a person skilled in the art that, as technology advances, the inventive concept can be implemented in various ways. The invention and its embodiments are not limited to the examples described above but may vary within the scope of the claims.

What is claimed is:

1. A data transfer method, comprising:
   acquiring pedalling data in a processing circuitry of a sensor, wherein the pedalling data characterizes a pedalling quantity measured by the sensor from a force transmission system of a bicycle;
   processing the pedalling data and forming in the processing circuitry a transmission data frame comprising header data and payload data, wherein the payload data comprises a first information element including at least a portion of the pedalling data and a second information element comprising service description data defining a type of the pedalling data;
   outputting in the processing circuitry the transmission data frame for wireless transmission to a user interface; and
   acquiring a configuration data frame in the processing circuitry from the user interface through a radio transceiver, the configuration data frame comprising configuration information specific to the force transmission system, which is applied by the processing circuitry when processing the pedalling data to form the transmission data frame.

2. A method according to claim 1, wherein the pedalling quantity characterizes pedalling power.

3. A method according to claim 1, wherein the pedalling quantity characterizes pedalling force.

4. A method according to claim 1, wherein the pedalling quantity characterizes the angle of crank.

5. A method according to claim 1, wherein the service description data indicates one of the following: pedaling force data, right side pedaling data, left side pedaling data, tangential pedaling force data, radial pedaling force data.

6. A method according to claim 1, wherein the transmission data frame further comprises a third information element comprising sensor indicator data defining a location of the measurement of the pedalling quantity, wherein at least one of the following locations is defined by the sensor indicator data: a pedal, a spindle in a bottom bracket, a crank arm, a bike body, a rear wheel axle, left side, right side, and a location from which chain vibration is measured.

7. A method according to claim 1, wherein the pedalling quantity characterizes a maximum value of a pedalling parameter.

8. The method of claim 1, further comprising forming, in the processing circuitry, a second transmission data frame comprising a header and a payload, wherein the payload comprises an information element comprising measurement configuration data defining a measurement configuration.

9. The method of claim 8, wherein the measurement configuration data indicates at least one of the following: a chain vibration length, a chain mass, a crank length, and a side from which the pedalling quantity is measured.

10. The method of claim 1, wherein the configuration data frame comprises at least one of the following configuration information: a mass of a chain, a vibration length, of the chain, and a calibration parameter for calibrating the pedalling quantity.

11. The method according to claim 1, wherein the pedalling data is acquired from a measurement circuitry, and the measurement circuitry and the processing circuitry are disposed on the force transmission system.

12. The method according to claim 1, wherein the configuration information comprises at least one of a calibration parameter and measurement configuration information, the measurement configuration information being associated with the force transmission system.

13. A computer program product embodied on a non-transitory distribution medium readable by a computer and comprising program instructions which, when executed by the computer, perform a computer process comprising:
   acquiring pedalling data with a sensor provided on a bicycle, wherein the pedalling data characterizes pedalling quantity measured by the sensor from a force transmission system of the bicycle;
   processing the pedalling data and forming a transmission data frame comprising header data and payload data, wherein the payload data comprises a first information element including at least a portion of the pedalling data and a second information element comprising service description data defining a type of the pedalling data;
   outputting the transmission data frame for wireless transmission from the sensor to a user interface; and
   acquiring a configuration data frame in the computer from the user interface through a radio transceiver, the configuration data frame comprising configuration information specific to the force transmission system, which is applied when processing the pedalling data to form the transmission data frame.

14. The computer program product according to claim 9, wherein the configuration information comprises at least one of a calibration parameter and measurement configuration information, the measurement configuration information being associated with the force transmission system.

15. An apparatus, comprising:
   a radio transceiver;
   a processor; and
   a memory comprising a computer program code, wherein the processor, the memory, and the computer program code are configured to cause the apparatus to:
      acquire pedalling data from a measurement circuitry of a sensor, wherein the pedalling data characterize pedalling quantity measured by the sensor from a force transmission system of a bicycle;
      process the pedalling data and form, in a processing circuitry of the sensor, a transmission data frame comprising header data and payload data, wherein the payload data comprises a first information element including at least a portion of the pedalling data and a second information element comprising service description data defining a type of the pedalling data;
      output the transmission data frame for wireless transmission to a user interface; and
      acquire, from the user interface through the radio transceiver, a configuration data frame in the processor, the configuration data frame comprising configuration information specific to the force transmission system, which is applied when processing the pedalling data to form the transmission data frame.

16. An apparatus according to claim 15, wherein the pedalling quantity characterizes pedalling power.

17. An apparatus according to claim 15, wherein the pedalling quantity characterizes pedalling force.

18. An apparatus according to claim 15, wherein the pedalling quantity characterizes the angle of crank.

19. An apparatus according to claim 15, wherein the service description data indicates one of the following: pedaling force data, right side pedaling data, left side pedaling data, tangential pedaling force data, radial pedaling force data.

20. An apparatus according to claim 15, wherein the transmission data frame further comprises a third information element comprising sensor indicator data defining a location of the measurement of the pedalling quantity, wherein at least one of the following locations is defined by the sensor indicator data: a pedal, a spindle in a bottom bracket, a crank arm, a bike body, a rear wheel axle, left side, right side, and a location from which chain vibration is measured.

21. An apparatus according to claim 15, wherein the pedalling quantity characterizes a maximum value of a pedalling parameter.

22. The apparatus of claim 15, wherein the configuration data frame comprises at least one of the following configuration information: a mass of a chain, a vibration length, of the chain, and a calibration parameter for calibrating the pedalling quantity.

23. The apparatus of claim 15, wherein the processor, the memory, and the computer program code are configured to cause the apparatus to form, in the processing circuitry, a second transmission data frame comprising a header and a payload, wherein the payload comprises an information element comprising measurement configuration data defining a measurement configuration.

24. The apparatus of claim 23, wherein the measurement configuration data indicates at least one of the following: a chain vibration length, a chain mass, a crank length, and a side from which the pedalling quantity is measured.

25. The apparatus according to claim 15, wherein the pedalling data is acquired from a measurement circuitry, and the measurement circuitry and the processor are disposed on the force transmission system.

26. The apparatus according to claim 15, wherein the configuration information comprises at least one of a calibration parameter and measurement configuration information, the measurement configuration information being associated with the force transmission system.

\* \* \* \* \*